(12) United States Patent
Dickins et al.

(10) Patent No.: US 10,504,501 B2
(45) Date of Patent: Dec. 10, 2019

(54) ADAPTIVE SUPPRESSION FOR REMOVING NUISANCE AUDIO

(71) Applicant: Dolby Laboratories Licensing Corporation, San Francisco, CA (US)

(72) Inventors: Glenn N. Dickins, Como (AU); Dong Shi, Shanghai (CN); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/073,390

(22) PCT Filed: Feb. 2, 2017

(86) PCT No.: PCT/US2017/016274
§ 371 (c)(1),
(2) Date: Jul. 27, 2018

(87) PCT Pub. No.: WO2017/136587
PCT Pub. Date: Aug. 10, 2017

(65) Prior Publication Data
US 2019/0066654 A1    Feb. 28, 2019

Related U.S. Application Data (60) Provisional application No. 62/298,371, filed on Feb. 22, 2016.

(30) Foreign Application Priority Data

Feb. 2, 2016 (WO) ................ PCT/CN2016/073188
Mar. 22, 2016 (EP) .................................... 16161565

(51) Int. Cl.
*G10K 11/178* (2006.01)
*H04M 9/08* (2006.01)

(52) U.S. Cl.
CPC .. *G10K 11/17823* (2018.01); *G10K 11/17853* (2018.01); *H04M 9/08* (2013.01);
(Continued)

(58) Field of Classification Search
CPC ....... G10K 11/17823; G10K 11/17853; G10K 2210/129; G10K 2210/3028
See application file for complete search history.

(56) References Cited

U.S. PATENT DOCUMENTS 5,012,519 A    4/1991  Adlersberg
6,049,607 A *  4/2000  Marash ................ H04R 3/005
                                                    379/406.08
(Continued)

FOREIGN PATENT DOCUMENTS

EP          2760221        7/2014
WO      2012/0158164     11/2012
WO       2016/176329     11/2016

OTHER PUBLICATIONS

Raghavendran, Srinivasaprasath, "Implementation of an acoustic echo canceller", Oct. 2003, located via Google scholar., Ph.D. Dissertation, University of South Florida, pp. 1-66.
(Continued)

*Primary Examiner* — Regina N Holder (57) ABSTRACT

Described herein is a method and audio capture system for suppressing noise due to mechanical disturbances in an audio capture system. In one embodiment a method includes the steps of: a) receiving an input audio signal from a microphone; b) receiving an input reference signal separate from the input audio signal; c) processing the input reference signal to generate a control signal for identifying a noise event; d) in response to the control signal, estimating a contribution of the noise event to the input audio signal by applying an adaptive filter to a sliding temporal window of the control signal in the frequency domain; and e) based on
(Continued)

the estimated contribution, selectively modifying the input audio signal to generate an output audio signal in which the noise arising from the noise event is at least partially suppressed.

28 Claims, 8 Drawing Sheets

(52) U.S. Cl.
CPC ............... *G10K 2210/1081* (2013.01); *G10K 2210/129* (2013.01); *G10K 2210/3028* (2013.01)

(56) References Cited

U.S. PATENT DOCUMENTS

| | | | |
|---|---|---|---|
| 6,606,382 B2 | 8/2003 | Gupta | |
| 6,944,289 B2 | 9/2005 | Tahernezhaadi | |
| 7,672,445 B1 | 3/2010 | Zhang | |
| 7,742,592 B2 | 6/2010 | Faller | |
| 7,813,923 B2 | 10/2010 | Acero | |
| 8,126,176 B2 | 2/2012 | Iwano | |
| 8,374,358 B2 | 2/2013 | Buck | |
| 8,462,958 B2 | 6/2013 | Kuech | |
| 8,594,320 B2 | 11/2013 | Faller | |
| 8,712,068 B2 | 4/2014 | Christoph | |
| 8,718,291 B2 | 5/2014 | Alves | |
| 8,792,649 B2 | 7/2014 | Yano | |
| 8,804,977 B2 | 8/2014 | Neal | |
| 8,867,757 B1 | 10/2014 | Ooi | |
| 8,913,754 B2 | 12/2014 | McClain | |
| 8,942,383 B2 | 1/2015 | Petit | |
| 8,964,998 B1 | 2/2015 | McClain | |
| 9,001,994 B1 | 4/2015 | Yang | |
| 9,173,025 B2 | 10/2015 | Dickins | |
| 9,373,343 B2 | 6/2016 | Dickins | |
| 2004/0213419 A1 | 10/2004 | Varma | |
| 2009/0003623 A1* | 1/2009 | Burnett | G10L 21/0208 381/92 |
| 2010/0145689 A1 | 6/2010 | Li | |
| 2013/0132076 A1 | 5/2013 | Yang | |
| 2013/0182868 A1 | 7/2013 | Krini | |
| 2013/0223645 A1 | 8/2013 | Hetherington | |
| 2013/0230184 A1 | 9/2013 | Kuech | |
| 2013/0336500 A1* | 12/2013 | Sudo | G10K 11/002 381/94.1 |
| 2014/0211955 A1 | 7/2014 | Hetherington | |
| 2015/0112672 A1 | 4/2015 | Giacobello | |
| 2017/0193978 A1* | 7/2017 | Goldman | H04R 1/1041 |

OTHER PUBLICATIONS

Durak, L. et al "Adaptive fractional Fourier domain filtering" , Apr. 2010, ACM Signal Processing, vol. 90, No. 4, pp. 1188-1196.

Kokkinis, Elias K. "Blind signal processing methods for microphone leakage suppression in multichannel audio applications", University of Patras, Department of Electrical and Computer Engineering, Jun. 2012, pp. 1-105.

Konate, Cheick Mohamed "Enhancing Speech Coder Quality: Improved Noise Estimation for Postfilters", Jun. 2011, Department of Electrical & Computer Engineering, McGill University, Montreal, Canada, Jun. 2011, pp. 1-82.

Tuffy, Mark, "The removal of environmental noise in cellular communications by perceptual techniques"., Dec. 10, 1999, a thesis submitted for the degree of Doctor of Philosophy, The University of Edinburgh, pp. 1-208.

Sidhu, Simranjit "Implementation of Active Noise Cancellation in a Duct"., Nov. 2013, A Thesis Submitted in Partia Fulfillment of the Requirements for the Degree of Bachelor of Applied Science in the School of Engineering Science, Simon Fraser University, pp. 1-82.

Gunther, J. et al , "Adaptive cancellation of acoustic echoes during double-talk based on an information theoretic criteria"., pub. Nov. 2009, located via Google scholar, Signals, Systems and Computers, 2009 Conf. 43rd Asilomar Conf. on, pp. 650-654.

Yang, F. et al "Stereophonic Acoustic Echo Suppression Based on Wiener Filter in the Short-Time Fourier Transform Domain", IEEE Signal Processing Letters, vol. 19, No. 4, Apr. 2012, pp. 227-230.

Faller, Christof "Perceptually Motivated Low Complexity Acoustic Echo Control" Media Signal Processing Research, Mar. 1, 2003.

Faller, C. et al "Suppressing Acoustic Echo in a Spectral Envelope Space" IEEE Transactions on Speech and Audio Processing, vol. 13, Issue 5, pp. 1048-1062, Aug. 15, 2005.

* cited by examiner

ADAPTIVE SUPPRESSION FOR REMOVING NUISANCE AUDIO

TECHNOLOGY

The present application relates to audio signal processing. More specifically, embodiments of the present invention relate to suppression of acoustic noise due to mechanical disturbance of microphones.

While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

In audio conferencing, the source of an audio signal is generally a microphone which is sensitive to acoustic stimulus and other mechanically coupled vibration. Generally for capturing audio from participants in a room, the desired acoustic sources are relatively distant, for example more than 500 mm from the microphones. However, the nature of a compact device with user interface and the possibility of other noise sources located closer to the device creates the potential for very loud and unwanted signals as detected by the microphone. Specifically, mechanical disturbances, such as the physical manipulation of one of the microphones or the operation of any user interface on an audio conference module, can give rise to associated acoustic noise or nuisance audio signals. Although the acoustic noise radiated into the room from such direct mechanical interference may be low and of no concern to those in the room, the interfering noise signals as detected and amplified by the microphone close to that disturbance can significantly affect far end conference participants. Undesired nearby acoustic interference or unwanted mechanical vibration will be picked up by the microphone as noise and then may be preferentially selected over the desired conversation audio.

Techniques are known for suppressing nuisance audio signals in systems of microphones positioned at known locations. However, to the inventors' knowledge, there is no known effective technique for suppressing the presence of nuisance audio on a single microphone module where the audio is not related to the output or echo of a known or well characterized stimulus. In particular, there is no work to the knowledge of the inventors that deals with attempting to work adaptively to optimize the suppression and avoid the loss of desired signal when the interfering nuisance sound is caused by an independent acoustical or mechanical disturbance. This is a particularly important use case where a system is designed to work in proximity to people and activity which may be closer to the capturing device than the desired acoustical object. This is often the case as described in a conference phone placed on a meeting table with people speaking from a range of distance, and some people operating the device or working on the table near the device. U.S. Pat. No. 8,867,757 B1 discloses system including a first housing that houses a plurality of mechanical keys. A first microphone that is configured to detect a dynamic noise is located within the first housing and under the mechanical keys. A second microphone is configured to detect acoustic waves that include speech and to convert the acoustic waves into an electrical audio signal. The dynamic noise is not associated with the detected speech. The system further includes a dynamic audio signal filter that is configured to suppress, in the electrical audio signal, dynamic noise, and the dynamic audio signal filter is activated in response to the first microphone detecting the dynamic noise. US 2010/0145689 A1 discloses that an audio signal is received that might include keyboard noise and speech. The audio signal is digitized and transformed from a time domain to a frequency domain. The transformed audio is analyzed to determine whether there is likelihood that keystroke noise is present. If it is determined there is high likelihood that the audio signal contains keystroke noise, a determination is made as to whether a keyboard event occurred around the time of the likely keystroke noise. If it is determined that a keyboard event occurred around the time of the likely keystroke noise, a determination is made as to whether speech is present in the audio signal around the time of the likely keystroke noise. If no speech is present, the keystroke noise is suppressed in the audio signal. If speech is detected in the audio signal or if the keystroke noise abates, the suppression gain is removed from the audio signal. US 2004/213419 A1 discloses various embodiments to reduce noise within a particular environment, while isolating and capturing speech in a manner that allows operation within an otherwise noisy environment. In one embodiment, an array of one or more microphones is used to selectively eliminate noise emanating from known, generally fixed locations, and pass signals from a pre-specified region or regions with reduced distortion.

SUMMARY OF THE INVENTION

In accordance with a first aspect of the present invention there is provided a method of suppressing noise due to mechanical disturbances in an audio capture system, the method including the steps of:
  a. receiving an input audio signal from a microphone;
  b. receiving an input reference signal separate from the input audio signal;
  c. processing the input reference signal to generate a control signal for identifying a noise event;
  d. in response to the control signal, estimating a contribution of the noise event to the input audio signal by applying an adaptive filter to a sliding temporal window of the control signal in the frequency domain; and
  e. based on the estimated contribution of the noise event, selectively modifying the input audio signal to generate an output audio signal in which the noise arising from the noise event is at least partially suppressed.
Preferably the method also includes the step of:
  b2. analyzing the input reference signal to classify potential noise events likely to be associated with an external disturbance; and
  the processing in step c. is based on the classifying in step b2).

In one embodiment the step of classifying potential noise events includes specifying a noise event when the reference signal power is greater than a predetermined threshold.

In one embodiment the step of classifying potential noise events includes specifying a noise event when the reference signal contains predetermined spectral characteristics.

In one embodiment the step of processing the input reference signal includes filtering the input reference signal to generate the control signal. In one embodiment the filtering includes performing signal gating on the reference signal to generate the control signal. The signal gating is preferably triggered by detection of a threshold amplitude of the reference signal. In another embodiment the processing the input reference signal includes extending the spectral content of the reference signal in the spectral domain to generate the control signal.

In one embodiment the step of processing the input reference signal includes adjusting the dynamic range of the input reference signal to generate the control signal.

In another embodiment the step of processing the input reference signal includes modulating the input reference signal with an external signal to generate the control signal.

In a further embodiment the step of processing the input reference signal includes generating a synthetic control signal having characteristics based on the input reference signal.

In one embodiment, in the absence of detecting a potential noise event, the control signal is the input reference signal. In another embodiment, in the absence of detecting a potential noise event, the control signal is zero.

In one embodiment the step of processing the input reference signal includes transforming the input reference signal and/or the input audio signal into the frequency domain. In one embodiment transforming the reference signal includes iteratively transforming the reference signal over predetermined time windows to calculate respective temporally evolving reference power spectra indicative of the reference signal, each reference power spectrum including reference power values separated into a plurality of frequency bins. The method preferably further includes the step of iteratively transforming the input audio signal into the frequency domain over the predetermined time windows to calculate respective temporally evolving signal power spectra indicative of the input audio signal, each signal power spectrum including signal power values separated into a like plurality of frequency bins to the reference power spectra. The reference power spectra and the signal power spectra may be banded power spectra where frequency bins are grouped into perceptual bands.

In one embodiment the predetermined time windows have a period in the range of 5 ms to 500 ms.

In one embodiment the step of estimating a contribution of the noise event to the input audio signal includes applying the adaptive filter in the frequency domain to the reference power spectra. The adaptive filter may be a linear filter calculating, for each frequency bin, a weighted sum of present and past reference power values in the sliding window for that frequency bin. The step of estimating a contribution of the noise event may further comprise determining parameters of the adaptive filter by comparing the signal power spectra and reference power spectra over a predetermined period of time. The predetermined period of time preferably includes time windows during a detected noise event or shortly before and/or after a detected noise event. In one embodiment the predetermined period of time includes a period covering 5 to 15 predetermined time windows.

In one embodiment comparing the power spectra includes iteratively performing a spectral subtraction of the reference power spectra from the signal power spectra across different predetermined time windows to determine a relationship between fluctuations of the respective power spectra.

In one embodiment comparing the power spectra includes performing a least mean squares method on the respective reference power spectra and signal power spectra over the predetermined period of time. In particular, the least mean squares method may be used to determine filter coefficients for the adaptive filter. For example, the adaptive filter may be updated using a normalized least mean squares method that iteratively updates filter coefficients based on a difference between the signal power spectra and the spectral contribution of the noise event to the input audio signal as estimated by the adaptive filter in the frequency domain.

In one embodiment the method includes the step of calculating estimated noise event power contribution values for each frequency bin in each spectrum within the predetermined period of time e.g. by applying the adaptive filter on each of the reference power values.

In one embodiment the step of selectively modifying the audio signal includes calculating suppression gain coefficients for each frequency bin within the predetermined period of time based on a comparison of the estimated noise event power contribution values with the signal power values within the predetermined period of time. Optionally, the noise event power contribution values and the signal power values may be smoothed before the comparison.

In one embodiment the method includes the step of multiplying the signal power values by the suppression gain coefficients to generate modified signal power values.

In one embodiment the method includes the step of inverse transforming the modified signal power values into the time domain to produce a modified audio signal.

In one embodiment the input reference signal is a vibration signal from a vibration sensor. In another embodiment the input reference signal is a detection signal from a button press on a user interface. In a further embodiment the input reference signal originates from a second microphone. In another embodiment input reference signal is a filtered version of an audio signal from the second microphone. In some embodiments the input audio signal and input reference signal are incoherent.

In accordance with a second aspect of the present invention there is provided an audio capture system for suppressing noise due to mechanical disturbances, the system including:
  a first input port for receiving an input audio signal from a microphone;
  a second input port for receiving an input reference signal separate from the input audio signal; and
  a processor configured for:
    processing the input reference signal to generate a control signal for identifying a noise event;
    in response to the control signal, estimating a contribution of the noise event to the input audio signal by applying an adaptive filter to a sliding temporal window of the control signal in the frequency domain;
    based on the estimated contribution of the noise event, selectively modifying the input audio signal to generate an output audio signal in which the noise arising from the noise event is at least partially suppressed.
  Preferably the processor is further configured for:
  analyzing the input reference signal to classify potential noise events likely to be associated with an external disturbance; and
  the processing of the input reference signal is based on the classifying.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview of the Invention

The present invention is adapted for adaptively suppressing audio signals based on the simultaneous measurement and processing of a reference signal. The invention includes some links to particular adaptive echo suppression techniques but can be applied to a broader range of applications. Adaptive detection and suppression of echo signals is performed in audio conferencing systems to improve the overall audio quality. In these echo suppression systems, the echo represents a known nuisance audio signal and so the characteristics of the signal to be suppressed are known. By definition, the echo is primarily linearly related to the output or reference signal. In this case an adaptive filter is used to match the relationship that exists between the physical acoustic output of the speaker and a microphone input, and subtract this estimate of the actual signal to reduce the impact of echo.

In the present invention, access to such a direct reference is not available, and the disturbance is largely incident on the system and created by some external agent or activity. This is a very different application and departs substantially from anything related to acoustic or vibrational echo where the disturbance is created by the device itself or some other related and connected system and audio output. In this case of adaptive signal processing for nuisance signals, both the acoustic signal at the microphone and a form of reference for the disturbance are detected by the device. Due to the similarity of some of the primitive components and signal processing in this approach, it can be seen that aspects of this embodiment may be integrated with the general function of echo and noise removal. It is generally known in the art that signal processing algorithms can be combined within the transform domain rather than only formed as concatenation of processing blocks. The embodiments of the invention described here focus on the generalized adaption for suppression of nuisance audio signals arising from mechanical disturbances.

A fundamental difference between echo suppression and cancellation is that a suppressor does not subtract an estimate of the echo component from the microphone signal. Rather the suppressor applies an attenuation profile ($G_N$) in the frequency domain to remove the spectral content that is due to echo. The suppression approach offers the advantage of being more robust to non-linearity and variation in the relationship between the echo reference and microphone pickup. On the other hand, suppressive algorithms will have impact on the desired signal at times where the echo is of a comparable level at any instant in time and frequency.

Figure 1:
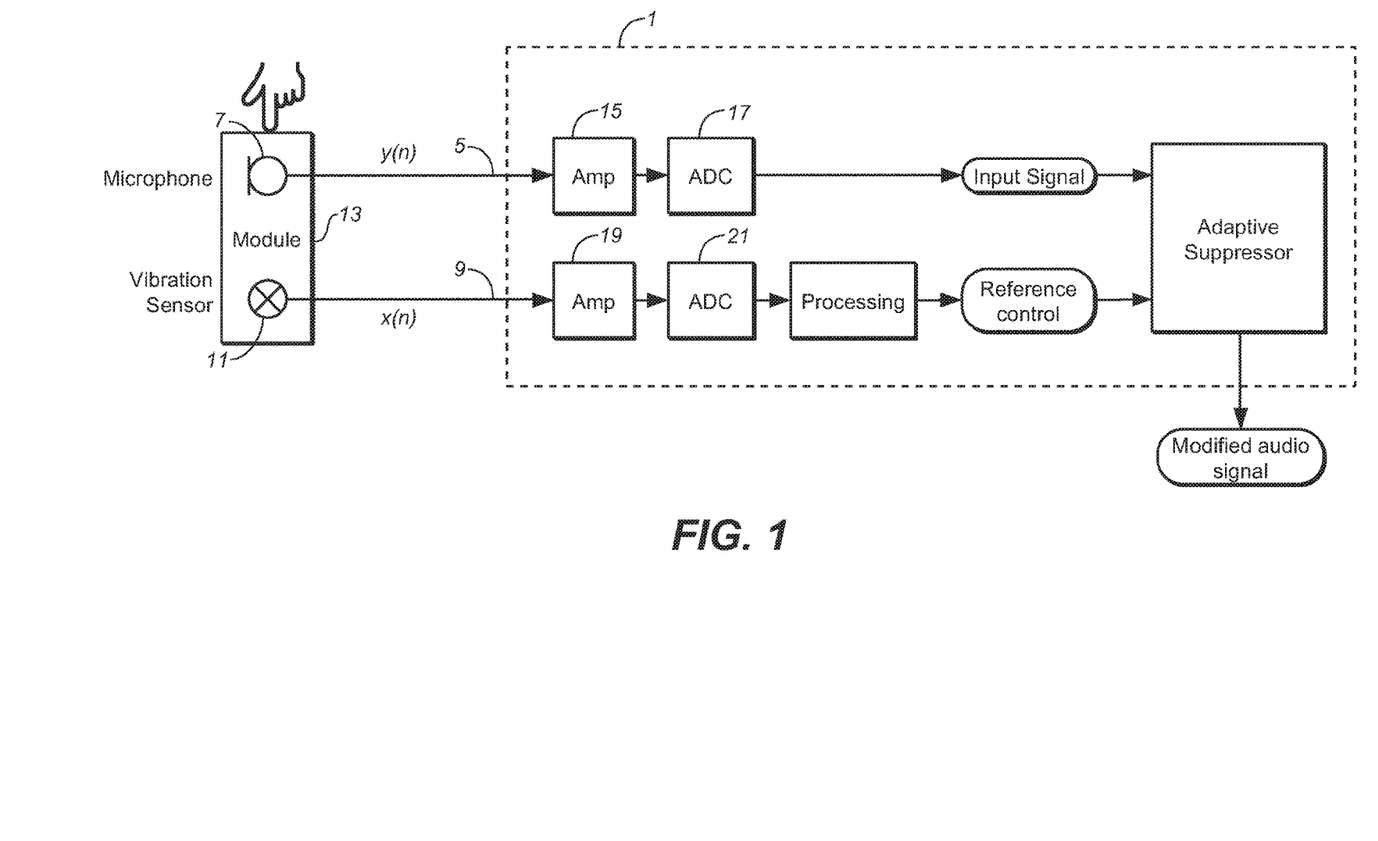
FIG. 1 is a schematic functional representation of an audio capture system for suppressing noise due to mechanical disturbances according to an embodiment of the present invention.

Referring to FIG. 1 there is illustrated a schematic functional diagram of an audio capture system 1 for suppressing noise due to mechanical disturbances. An example application of system 1 is a central audio mixing module for an audio conference. In one embodiment, system 1 is implemented on the hardware of a personal computer which leverages the associated computer processor.

System 1 includes a first input port 5 for receiving an input audio signal y(n) from a microphone 7. A second input port 9 is provided for receiving an input reference signal x(n) that is separate from input audio signal y(n). Here the term 'separate' indicates that the reference signal is not derived directly or indirectly from the input audio signal such as a duplicate of the audio signal used in echo suppression. Although the reference signal may be include information relating to associated audio objects or origins, the actual signal is captured by a separate sensor, device or input to the microphone used to capture the input audio signal.

Ports 5 and 9 can be any type of audio connection known in the art such as a standard 3-5 mm audio jack. An example reference signal is a vibration signal received from a vibration sensor 11 co-located within a module 13 together with microphone 7. However, various other types of reference signal are possible, such as a control or detection signal from a button press on a user interface (keyboard presses, mouse clicks etc), an activity signal, audio signal or filtered audio signal from a second microphone. In some embodiments, input audio signal y(n) may be indicative of audio from more than one microphone collocated within module 13. It is envisaged and a general extension that this approach would work with a wider range of spatial microphones, microphone arrays, and reasonable diversity where the one input reference is seen to relate to an expected disturbance at several microphones.

Figure 2:
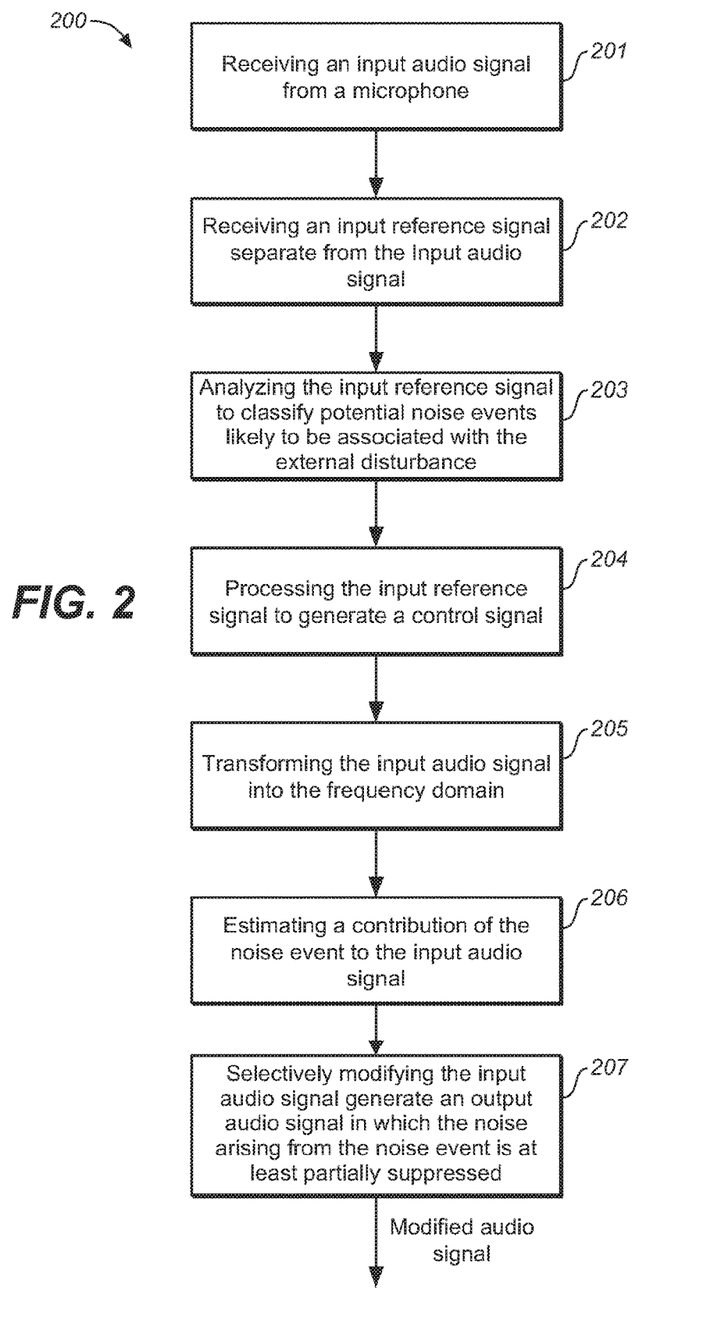
FIG. 2 is a process flow diagram illustrating the primary steps in a method of suppressing noise due to mechanical disturbances in an audio capture system.

System 1 is adapted for performing a method 200 as illustrated in FIG. 2 and the operation of system 1 will be described with reference to method 200. Steps 201 and 202 relate respectively to the receiving of the input audio signal y(n) and input reference signal x(n) as mentioned above.

At step 203, reference signal x(n) is analyzed to classify potential noise events that are likely to be associated with the external disturbance. Noise events include mechanical handling of microphone, movement of objects proximate to the microphone, actuation of buttons on an interface associated with system 1 or reverb associated with a second microphone. Classification may be a binary ('noise event' or 'no noise event') classification by specifying a noise event when the reference signal power is greater than a predetermined threshold, or a higher order classification to classify the type or degree of potential noise events such as when the reference signal contains predetermined spectral characteristics. Classifying may include creating a continuous probability measure (say something that varies from 0 to 1).

Figure 3:
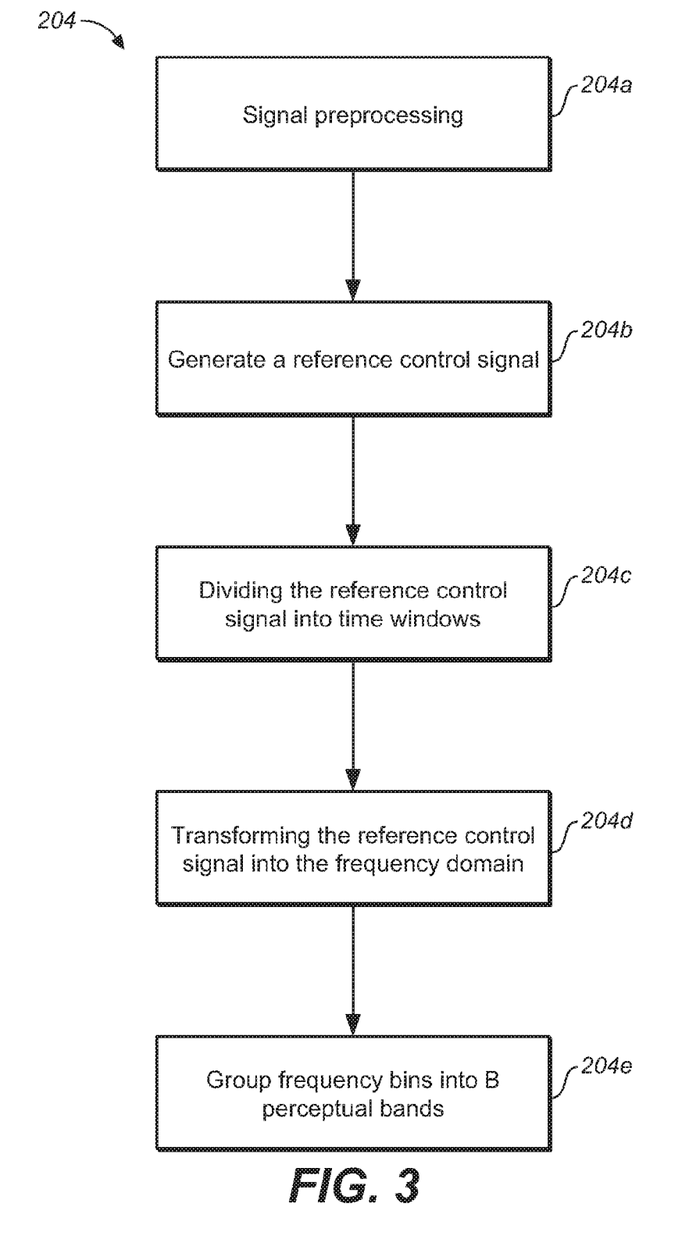
FIG. 3 is a process flow diagram of sub-steps of a processing step in the method of FIG. 2.

At step 204, based on the classifying in step 203, the input reference signal is processed to generate a reference control signal $\hat{x}(t)$. This processing includes several sub-steps as illustrated in FIG. 3. At sub-step 204a, signal preprocessing is performed including amplification by amplifier 15 and analog to digital conversion by ADC 17.

At sub-step 204b, a set of signal processing is carried out to generate the reference control signal. The signal processing includes one or more of:

a) Filtering the reference signal in the form of linear or non-linear operations on the sampled audio;
b) Dynamic range expansion of the reference signal including compression, expansion or gating in order to selectively pass more or less of the signal based on some local measure of the signal activity;
c) Classification of reference signal activity and events in order to synthetically create the reference control signal that is more representative of a set of events rather than specific mechanical or acoustical vibration; or
d) Substantially replacing the reference signal or spectral estimation of the reference source with an appropriate reference control signal based on classification, non-linear amplitude mapping.

In the absence of detecting a potential noise event, the control signal may be set to be the input reference signal or set to zero. The general rationale and goal of the processing in step 204b is towards creating a broadband stimulation of the adaptive suppression system when significant nuisance is likely to be present at the acoustic microphone pickup.

Figure 4:
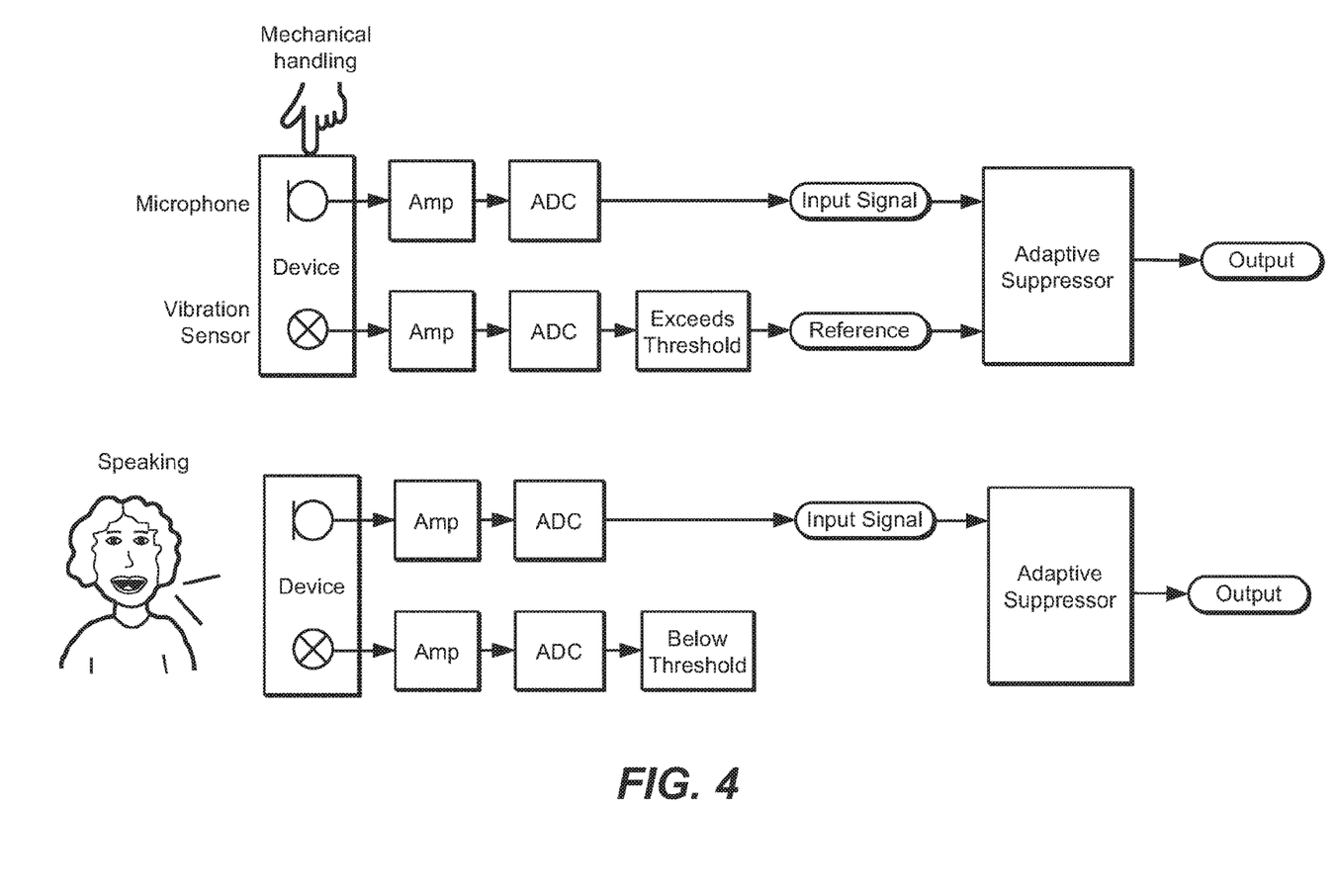
FIG. 4 is a schematic illustration of two scenarios of signal gating.

For example, in the case of signal gating used in some embodiments reference is made to the process of selectively muting, deactivating or ignoring an input signal if the amplitude of that signal falls below a predetermined threshold. This concept is illustrated schematically in the context of the present invention in FIG. 4. The top panel of FIG. 4 illustrates a scenario where mechanical handling of module 13 is in progress. This mechanical handling gives rise to significant mechanical vibrations which are detected by vibration sensor 11, which generates reference signal x(n) as a corresponding vibration signal. As the detected vibrations are significant, the reference signal exceeds the gating threshold and the reference signal is further processed. The lower panel of FIG. 4 illustrates the normal scenario of a conference participant speaking into microphone 7. This speaking produces only small mechanical vibrations which fall below the predetermined gating threshold. The gating threshold is preferably calibrated such that the threshold is significantly higher than the normal acoustic vibrations detected during speech.

For example, in one embodiment, it was found that for a contact microphone signal levels as referred in a digital domain of up to −30 dB full scale were apparent in the presence of acoustical activity, whilst vibration activity related to nearby contact or nuisance achieved levels substantially above this. By inspection, a threshold was set such that any pickup of the contact (mechanically coupled) microphone was ignored to the point of a user shouting loudly centimeters from the device. This threshold of −30 dB then allowed for significant mechanical activity to pass through and be utilized for adaptively reducing the impact of this nuisance on the microphone capture.

By gating in this way, the reference signal becomes largely an impulse and very much non-linearly related to the audio content in the input audio signal. Furthermore, much of the actual signal coming from the vibration sensor may be replaced with a gated or amplitude modulated broadband noise. The reason and benefit for this will be explained below.

In alternative embodiments, step 203 can be skipped such that the processing of step 204 is performed directly on the input reference signal.

Returning to FIG. 3, at sub-step 204c, the reference control signal $\hat{x}(t)$ is divided into time windows of a predefined time duration (window size). Exemplary window sizes are in the range of 5 ms to 500 ms and preferably about 20 ms. At sub-step 203e, each time window is transformed into the frequency domain by a form of transform or subband filtering (for example the Short-Time Fourier Transform (STFT)). The result is a reference power spectrum $X_N$ indicative of the power-frequency distribution of the reference signal during each time window. Each reference power spectrum includes reference power values separated into a plurality of frequency bins. At sub-step 204e, the frequency bins may be grouped into B perceptual bands, spaced on a perceptually motivated scale with an inter-band distance of approximately 1 Bark. In other embodiments, the frequency bins may be grouped into bands based on other acoustic scales. A typical embodiment has 30-40 bands over the operational audio frequency range. Given the frequency domain coefficients $X_k$ of the reference power spectrum, the banded power values are computed as $$X_i = \sum_{k=0}^{N-1} w_{i,k} |X_k|^2$$

where $w_{i,k}$ represents the $k^{th}$ bin weight for the $i^{th}$ spectral band. This has many advantages, including reduced computational complexity, matching the critical bandwidth of the human auditory system, and a robustness to slight spectral variations or sampling rate shifts between the input and output. Step 204 is performed iteratively on the reference signal to calculate respective reference power spectra indicative of the temporal spectral evolution of the reference signal. The resulting banded reference power spectrum is designated as $X_B$.

Returning to FIG. 2, at step 205, the input audio signal y(n) is similarly processed by an amplifier 19 and ADC 21, and transformed to the frequency domain in a similar manner to the reference signal x(n) described above. That is, the input audio signal is divided into time windows having the same start times, end times and duration as the windows for the reference signal. Each time window of the input audio signal is transformed into the frequency domain to form signal power spectra $Y_N$ indicative of the power-frequency distribution of the input audio signal during each time window. Each signal power spectrum includes signal power values separated into a plurality of frequency bins similar to the reference power spectra. The resulting banded signal spectrum is designated as $Y_B$. The subsequent smoothed signal power estimates of $Y_B$ are designated as $S_B$. By way of an example embodiment, the previous 3 paragraphs set out one approach for creating a set of reasonably spaced frequency selective estimators for the power in each of the input and where required also the processed (output of 203) reference signals. Such approaches are well known in the field and may be referred to, for example and not exhaustively, filter-banks, frequency analysis, lapped transforms, sub-band filtering, and many forms of banded power short-time frequency transform.

At step 206, in response to the control signal the contribution of the noise event to the input audio signal is estimated. This includes comparing the signal power spectra and reference power spectra over a predetermined period of time using an adaptive filter procedure. In this procedure, the current and previous time samples of the power spectrum of the reference signal are passed through a filter which is adaptively estimated and this is used to drive a spectral suppressor via the application of an attenuation profile across frequency to the captured input audio signal.

In one embodiment, step 206 is performed by the reference signal being passed through a perceptual band domain block adaptive filter with L filter taps. The output ($E_B$) represents the estimated contribution of the reference power representing the noise event to the input audio signal for the current time window (frame) of audio.

$$E_B = \sum_{l=0}^{L-1} F_{B,l} X_{B,l}$$

Where $F_{B,l}$ is the vector of B filter taps for the $l^{th}$ time lag, and $X_{B,l}$ is the vector of B banded reference powers for the $l^{th}$ time lag. The linear filter estimates, separately for each band, the contribution of the reference power to the noise event in the input audio signal by a weighted sum of the present reference power of the band and previous reference powers of the band within a sliding temporal window defined by L. The sliding temporal window is applied, separately for each band, to banded reference power values $X_{B,l}$. A typical value of L for a 20 ms frame size is 10 providing an overall temporal window of 200 ms for estimating the contribution of the noise event to the input audio signal. In the case of nuisance and disturbance that is close to the capturing microphone, it is reasonable that this length be kept short in order to improve the filter stability. Provided that the bulk delay is aligned between the reference signal and the first expected disturbance at the microphone, then the filter can be shortened. Note that the effects of acoustic reflections in the room are largely irrelevant in this application as we are dealing with disturbance that is generally near one or more microphones and whilst significant at that microphone is not a problem to the wider room. Nuisance signals that are loud enough in the room for the reverberation time of the room to be a factor would generally be noticed and avoided by the participants. A further note is that the filtering need not be causal, in that where the reference signal is expected to arrive with some delay after the microphone disturbance, a suitable delay can be applied to the normal microphone signal in order to align the reference and microphone activity. Whilst undesirable, such delays are necessary and may be further controlled based on the ongoing presence and extent of nuisance as detected at a given microphone and reference. In this exemplary implementation, the adaptive filter is updated using the normalised least mean squares (NLMS) method. The update of the filter parameters (e.g. filter tabs) may be for each frame or multiple frames such as the temporal window of the filter. However, it will be appreciated that other iterative data fitting routines can be implemented. Using the NLMS method, an updated filter coefficient $F'_{B,l}$ is calculated from the previous coefficient $F_{B,l}$ with the following update rule where $\mu$ is a parameter to control the update speed:

$$F'_{B,l} = F_{B,l} + \mu \frac{(Y_B - E_B) X_{B,l}}{\sum_{l'=0}^{L-1} X_{B,l'}^2 + X_{sens}}$$

The parameter $X_{sens}$ is used to ensure the adaption is stable for low signal levels (typical values of $X_{sens}$ are in the order of −85 dB). The estimated contribution of the reference power $E_B$ to the noise event in the input audio signal is applied with an asymmetric smoothing rule with instantaneous attack and release controlled by a constant $\alpha_N$ (typical value of 0.5 for a 20 ms buffer size) to calculate smoothed estimates of the noise event power contribution $N_B$ indicative of the spectral power contribution of the noise event to the input audio signal. The subsequent estimate of the smoothed noise event power contribution $N'_B$ for the next window is calculated from the previous estimate $N_B$:

$$N'_B = \begin{cases} \text{if } E_B \geq N_B: & N'_B = E_B \\ \text{if } E_B < N_B: & N'_B = \alpha_N E_B + (1 - \alpha_N) N_B \end{cases}$$

Figure 5:
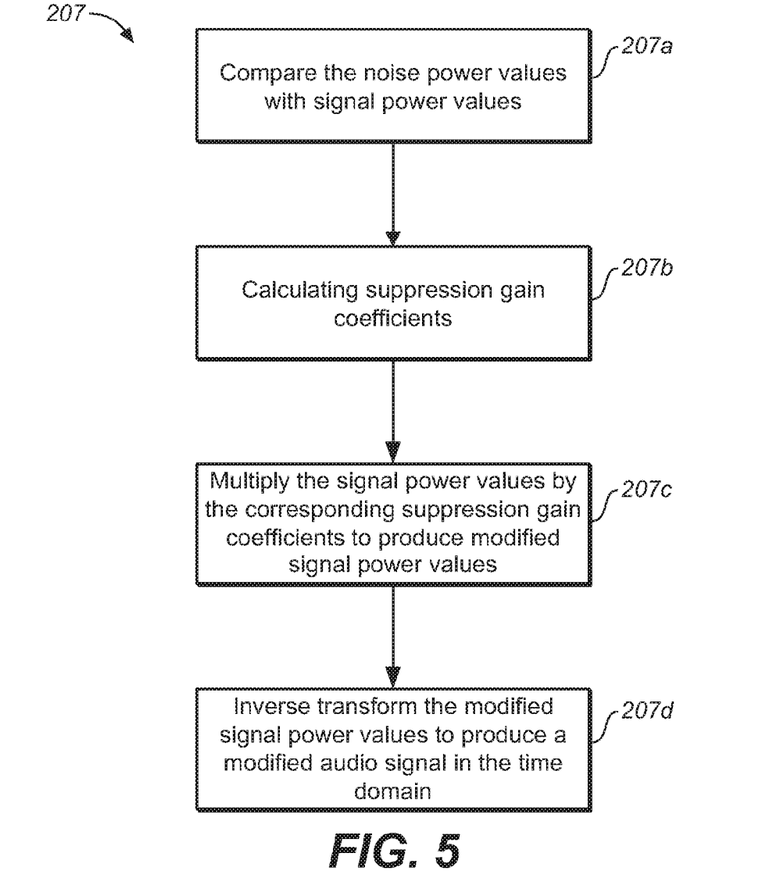
FIG. 5 is a process flow diagram of sub-steps of modifying the audio signal in the method of FIG. 2.

At step 207, the input audio signal is selectively modified to generate an output audio signal in which the noise arising from the noise event is at least partially suppressed. This step includes a number of sub-steps as illustrated in FIG. 5. At sub-step 207a, the smoothed noise event power contribution values $N_B$ are compared with the corresponding smoothed signal power values $S_B$ at each time window. At sub-step 207b, this comparison is used to calculate suppression gain coefficients $G_B$ for an attenuation profile $G_N$:

$$G_B = \min\left(G_{min}, \frac{\max(0, S_B - \gamma_N N_B)}{S_B}\right)^2$$

The parameter $\gamma_N$ is an over subtraction factor to control the aggressiveness of the echo suppression (typical value of 3 dB). Parameter $G_{min}$ defines a minimum attenuation that will be applied to each band (typical valid of −60 dB). The banded gain coefficients are interpolated to produce a set of N frequency bin gains defining the attenuation profile $G_N$ by inverting the mix matrix used to form the bands.

At sub-step 207c, the attenuation profile $G_N$ is multiplied by complex frequency bin vector $Y_N$ to derive modified signal power values. Finally, at sub-step 207d, and the resulting data is passed through an inverse transform to produce a modified audio signal in the time domain.

Steps 206 and 207 of method 200 can be performed in software by an adaptive suppressor routine, as illustrated in FIG. 1. The functional steps of such an adaptive suppression routine are summarized schematically in FIG. 6. The adaptive suppressor will converge to find a gain and temporal relationship between any fluctuations in the reference power spectra and signal power spectra, and from this determine gains where there is a predicted and seemingly causal relationship. That is; where activity on the reference seems to be followed by energy with a correlated temporal and spectral envelope on the input. This component is able to be tuned to be quite robust to errors in spectral activity, and by nature will adapt to estimate the temporal relationship between the two signals.

In other works it has been observed that specific types of impulsive noises, for example button clicks, have a fairly consistent spectral shape and often consistent amplitude. Whilst at first it may seem that the gating and conversion of the reference to something broadband and impulsive (or amplitude modulated) is ineffective and problematic for the adaptive suppressor, in fact gating the reference signal is advantageous and the following is noted:

The adaptive suppressor can converge reasonably quickly, and when it is enabled by energy on the reference, will be aggressive by design in finding and suppressing temporally related content. Thus, gating the reference signal can help to more quickly identify the noise contribution to the input audio signal and suppress that noise.

Whilst the above technique is aggressive, it is also much more selective in both time and frequency than conventional and prior art methods which may totally attenuate or suppress the captured audio signal for a conservative period of time when a noise event is detected.

Impulsive and handling noise is often repeated and similar in nature (for example repeated taps on a screen or of a volume button) and hence the learning process of the adaptive suppressor can be very effective in determining a good estimation of the suppression.

The depth and regularization of the suppression can be tuned to allow a maximal level of suppression rather than complete distortion of the input signal, allowing the system to perform well when there is both a disturbance (as indicated by the gated reference) and some other desired signal. Specifically, the system may choose to limit the suppression of nuisance signals as identified in the adaptive system by an amount. In one embodiment a limit on the suppression of 10 dB was found to have a good compromise of reducing the impact of the nuisance without sacrificing ongoing audio capture in the room.

It will be understood that the above methodology may be performed simultaneously on multiple input audio signals from different microphones in an audio conferencing system. Similarly, the above methodology may be performed simultaneously using multiple reference signals adapted for detecting different distinct types of mechanical disturbances.

Applications and Extensions of the Invention

Impulsive Reference—Discrete Button/User Interface Activity

In many situations, for example pressing of a volume button, there is a direct and unambiguous indication of the mechanical activity in the device from the resulting actuation signal. This type of signal and activity creates a single valued reference signal, though quite often represents a very consistent spectral, temporal and amplitude disturbance with a temporal relationship to the button activity signal.

This case is labeled an 'impulsive' reference, where it has been already thresholded or gated so that there is a very high confidence that the event in this signal is or will be associated with some disturbance or nuisance detection at the microphones.

Figure 6:
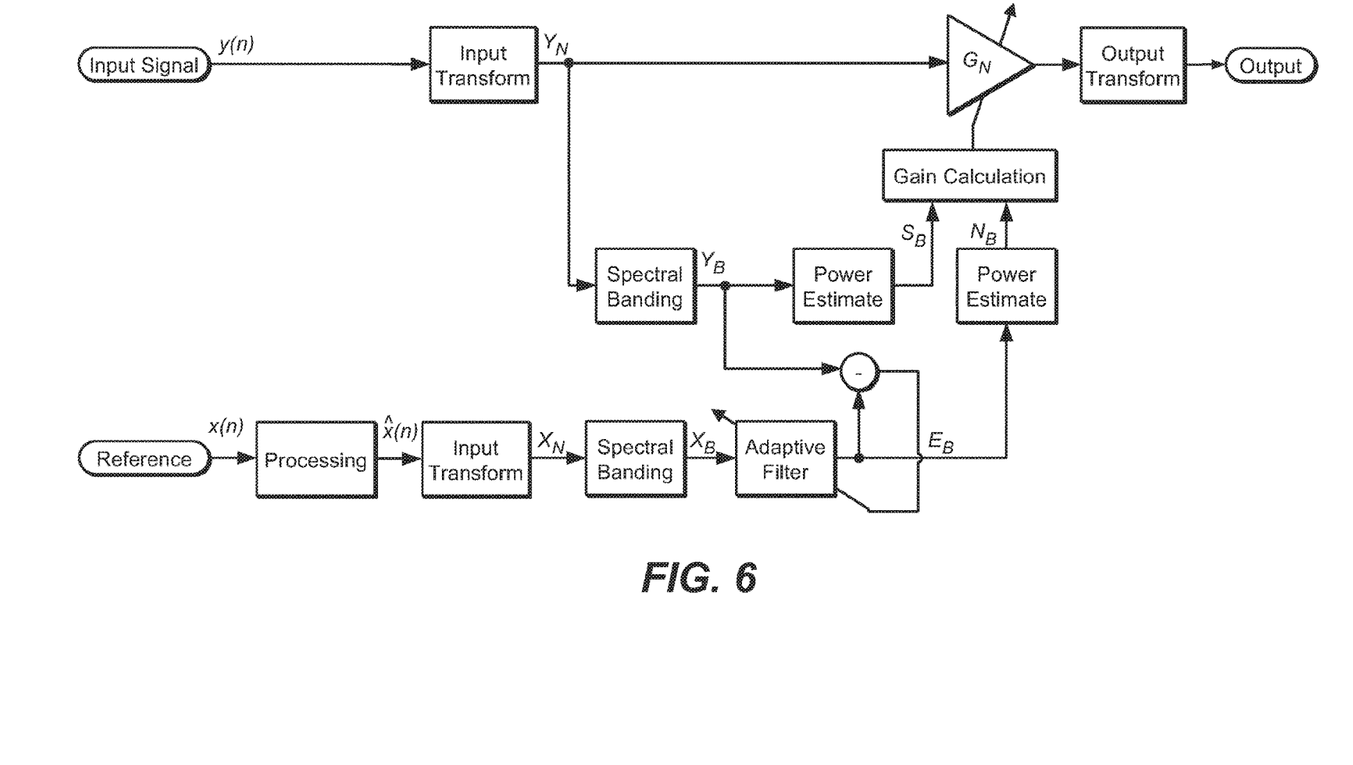
FIG. 6 is a schematic summary functional view of a subset of the steps in the method of FIG. 2.
Figure 7:
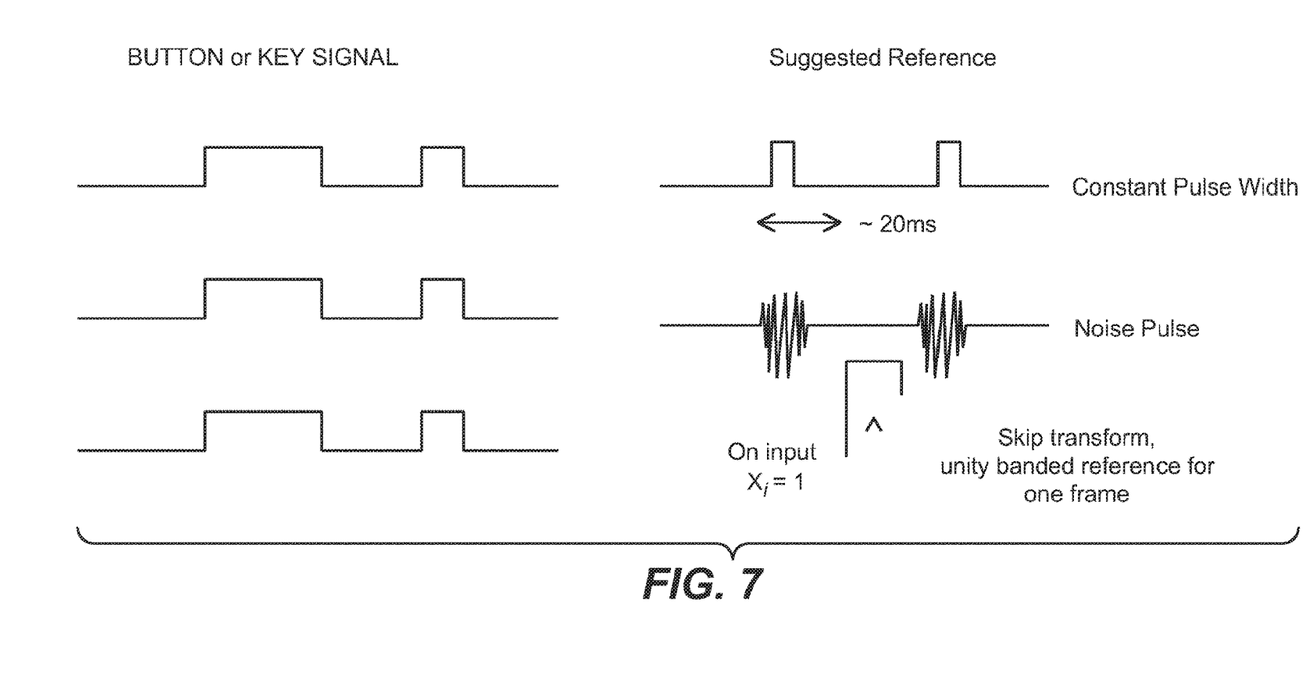
FIG. 7 illustrates three embodiments of creating or modifying a reference signal for the adaptive suppressor based on an impulsive activity signal.

For suppressing impulsive references, additional signal processing may be advantageous over and above that described above. As discussed above, the adaptive filter will adjust to match the temporal presence of spectral energy in its output (e.g. $E_B$), where there is some excitation in the same spectral bands in its input (e.g. $X_B$). Therefore, it may be advantageous to process impulsive references by modifying them to create a broadband excitation. The following embodiments are possible and illustrated in FIG. 7:

a) The impulse itself is broadband, however if coming from a button or key scan code it may have a different duration for certain presses. The mechanical noise of a button is generally associated with the press action (and also the release). In this scenario, the rising and/or falling edge of a particular button press is modified into a fixed length to define a constant energy reference signal. This is illustrated in the top scenario of FIG. 7.

b) Each noise event designated by a rising and/or falling edge is replaced with a burst of noise. This may be broadband or alternatively shaped to match the expected spectra of the disturbance. Since the suppressive adaptive filter is only sensitive to the power spectra, it is possible to use an exemplary audio capture of the disturbance itself. Such an approach can aid in the adaption and suppression of the disturbance. This is illustrated in the middle scenario in FIG. 7. It is a reasonable and expected extension that different levels of burst or synthetic signal may be used for each of the rising and falling edges, and where possible the use of different scan codes or characteristics of key events may be further used through the use of different reference stimulus or by use of the reference input to an alternate adaptive filter.

c) Since the goal here is to excite the reference power spectrum, it is feasible to skip the input transform step of the reference signal and proceed directly to an impulsive activity on the banded reference power spectrum $X_B$ (labeled as 3 in FIG. 6). Again the spectra here may be broadband (unity or other across all bands) or shaped to match the expected or an exemplary sample of the expected disturbance correlated with the event. This is illustrated in the bottom scenario in FIG. 7.

Amplitude Varying Impulsive Reference

In some instances the indication of activity may include some representation of amplitude that would correlate with the power as seen by the microphone(s) related to the disturbance. For example, some devices such as a piano keyboard, include velocity sensors on the keys, and other UIs such as a touch screen may estimate contact velocity and/or force applied to the screen.

Figure 8:
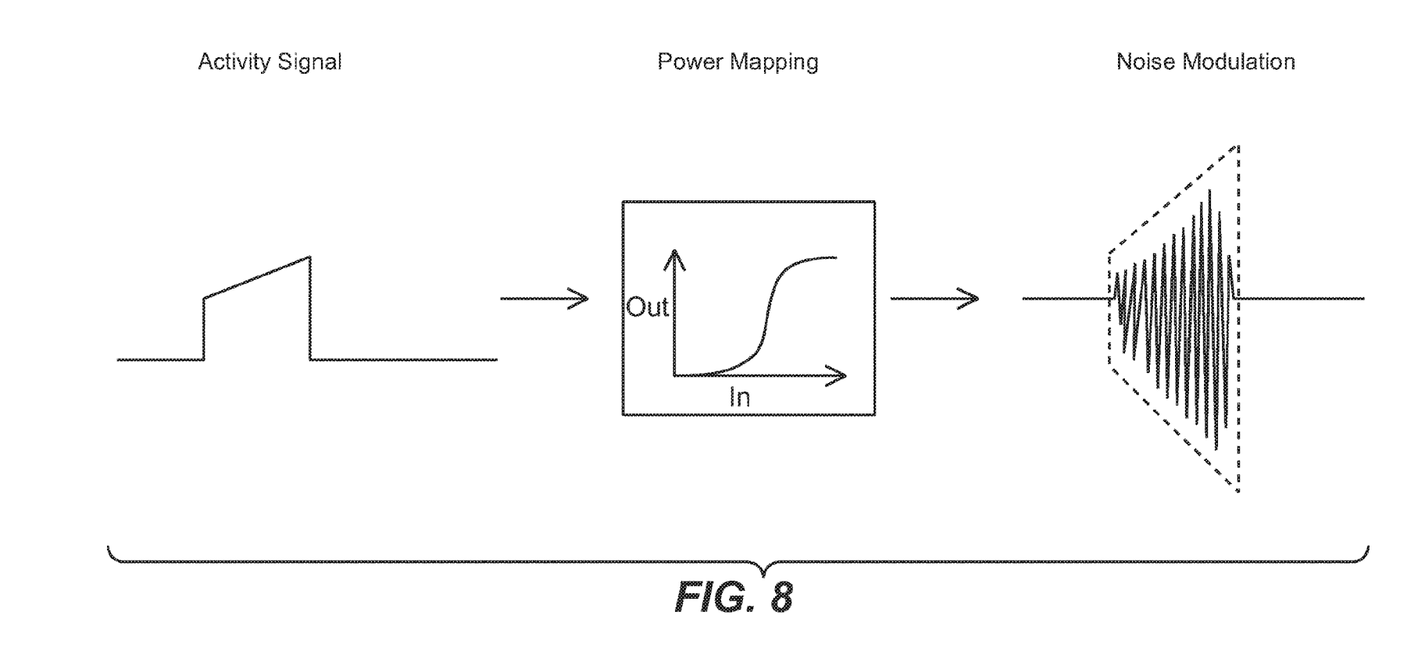
FIG. 8 illustrates schematically, the use of a reference signal to modify the envelope of a synthesized noise burst.

In such cases, the reference is not necessarily an impulse, and the indication of activity may not directly map to the power level of the disturbance. In these cases, often a simple mapping can be empirically obtained through observation, trial tuning or machine learning. For the case of a stateless mapping from the indication of activity to the expected level of the disturbance, the embodiment illustrated in FIG. 8 can be utilized, whereby the incoming reference signal that is already gated, is used to modify the envelope of a synthesized noise burst having an appropriate spectral range and potentially shape to match the expected disturbance.

Extensions on Potential Source of the Reference Control

In the previous two sections, the suggested embodiments have extended the approach to start with inputs into the suppressive system that are no longer specifically related or coherent with the microphone response and activity caused by the disturbance. A wide set of extensions to the invention are envisaged where the indication of likely disturbance at the microphone is substantially extended.

In each case, the suggested input can be reasonably transformed through gating, feature extraction, classification, stateless mapping and even temporal filtering. In the most general example, some indication is provided that an event has happened, and in principle a component is suggested that makes an approximation of what sound or mechanical disturbance would relate to that event. Noting that the approximation of the signal need not be exact in any sense of spectral envelope or temporal modulation, and the best results are often obtained with a simple and short (20 ms) impulsive excitation of the reference signal.

Self Noise

In some cases, the vibration corrupting the microphone may be created by activity within the device itself. Some examples here include:

Vibration or other haptic feedback to the user;

Mechanical manipulation such as lens adjustment or focusing etc.; or

Haptic and vibrational feedback devices and actuators.

In these cases, the control signal to the output mechanical transducer can be used as a reference. As in other embodiments, the extension of the signal can be performed to create a suitable excitation of reference that could match all possible signal components caused by the mechanical activity.

In the diagrams and descriptions above, it is reasonable to infer that all acoustic microphones may in fact be one or more microphones in each module, allowing for the individual capture of spatial audio from each microphone module, and the overall output of a multichannel audio representation of the scene. Generally, only a single vibration sensor would be required for each mechanically separate microphone module.

Pre-Emptive Estimation

Using the present invention, there is also the potential for other methods of detecting or pre-emptively detecting handling and vibration. Examples include:
- accelerometer for detecting device movement and reorientation (for example a falling device prior to hitting a hard surface);
- capacitive sensor that can detect proximate hand or user gestures;
- visual or optical sensing to detect movement approaching or nearby the device and choose to remove it from potential selection or audio input in the mix; or
- acoustic ultrasonic ranging from the microphone and some output transducer (piezo or speaker) based on Doppler or ranging techniques.

Given the adaptive process of the invention, there will be a natural reduction in the estimated gain of the disturbance within the adaptive filter $N_B$ if there are repeated occurrences of the reference signal occurring without an associated activity at the microphone. This can be managed with tuning and adaption constants. In particular a slow adaption can deal with false positives, an asymmetric adaption can have greater retention of events that did correlate with high energy at the microphone, the overestimation parameter $\gamma_B$ in the suppression equation can be set high.

Keyboard Activity Detection

The idea of using a keyboard scan code to suppress or gate the microphone has been seen in some prior art, however the approaches are generally coarse gating of the microphone signal in order to effectively mute microphone capture when the user is typing. The present invention is able to provide an improved solution to this problem:
- The system is able to learn the typical characteristics of the vibrational coupling, resonance and general disturbance arising from a keyclick, this adaption removes the need for any apriori knowledge of key click noises or training.
- The specific key scan code can be used, for example, to give an indication of proximity to a microphone in the system (e.g. laptop) and again provide a more selective suppression avoiding the removal of desired input.
- There is indication that different users will have characteristic pressure and stroke velocity of keys, and this will be naturally learned by the adaptive system.

Mouse Click Detection

Similar to the detection of keyboard strokes, the present invention can also be used to detect the event of mouse clicking by using the 'clicking' flag from the system as the input to the adaptive system. Compared to a keyboard, mouse clicking usually gives a more consistent sound, regardless of the users. Also, the number of buttons on a mouse is much fewer than that of a keyboard, resulting easier classification and learning of the spectral curve.

Feature Extraction Detection

In the case of a microphone module having more than one microphone, it can be noted that a degree of vibration sensing can be obtained from consideration of the covariance or spatial parameters detected by those microphones. In particular, for microphones that face different directions or are somewhat separated, any acoustical signal should present differently at the microphones whilst mechanical vibration may appear quite correlated and time aligned. In this way, where the microphone module includes more than one acoustic microphone, it is possible in this invention to derive the detection of a vibration signal from some filtering or feature detection on the microphone array. At this point, such a signal represents an indication of vibration and can be employed in a similar way to the impulsive reference signal detailed elsewhere in this invention.

CONCLUSIONS

It will be appreciated that the above described invention provides significant systems and methods for suppressing acoustic noise associated with events of mechanical disturbance.

The present invention is a novel approach to the suppressive removal of nuisance audio signals where there is some additional reference signal that is temporally correlated with the nuisance but not coherent or predominantly linearly related to the disturbance signal occurring at the microphone. In particular, a key problem is the nuisance audio signal detected at the microphone due to activity around, near or on the microphone module itself. When the reference signal originates from a vibration sensor collocated within a microphone module, mechanical noise arising from the handling of the microphone module or the operation of any user interface and buttons that may be located on the module can be detected and suppressed efficiently.

Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects.

Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (e.g., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A method of suppressing noise due to mechanical disturbances in an audio capture system, the method including the steps of:
   a. receiving an input audio signal from a microphone and transforming the input audio signal into frequency domain;
   b. receiving an input reference signal from a sensor other than the microphone, wherein the input reference signal is separate from the input audio signal;
   c. processing the input reference signal to generate a control signal for identifying a noise event, wherein processing the input reference signal includes transforming the input reference signal into the frequency domain;
   d. in response to the control signal identifying a noise event, estimating a contribution of the noise event to the input audio signal; and
   e. based on the estimated contribution of the noise event, selectively modifying the input audio signal to generate an output audio signal in which the noise arising from the noise event is at least partially suppressed,
   wherein transforming the reference signal includes iteratively transforming the reference signal over predetermined time windows to calculate respective temporally evolving reference power spectra indicative of the reference signal, each reference power spectrum including reference power values separated into a plurality of frequency bins;
   wherein transforming the input audio signal includes iteratively transforming the input audio signal into the frequency domain over the predetermined time windows to calculate respective temporally evolving signal power spectra indicative of the input audio signal, each signal power spectrum including signal power values separated into a like plurality of frequency bins to the reference power spectra; and
   wherein estimating the contribution of the noise event to the input audio signal involves applying an adaptive filter in the frequency domain to the reference power spectra and determining parameters of the adaptive filter by comparing the signal power spectra and the reference power spectra over a predetermined period of time, wherein the parameters of the adaptive filter are based on a difference between the reference power spectra after applying the adaptive filter and the signal power spectra.

2. A method according to claim 1 including the step of:
   b2. analyzing the input reference signal to classify potential noise events likely to be associated with an external disturbance; and
   wherein the processing in step c is based on the classifying in step b2.

3. A method according to claim 2 wherein the step of classifying potential noise events includes specifying a noise event when the reference signal power is greater than a predetermined threshold.

4. A method according to claim 2 wherein step of classifying potential noise events includes specifying a noise event when the reference signal contains predetermined spectral characteristics.

5. A method according to claim 2 wherein, in the absence of detecting a potential noise event, the control signal is the input reference signal.

6. A method according to claim 2 wherein, in the absence of detecting a potential noise event, the control signal is zero.

7. A method according to claim 1 wherein the step of processing the input reference signal includes filtering the input reference signal to generate the control signal.

8. A method according to claim 7 wherein the filtering includes performing signal gating on the reference signal to generate the control signal.

9. A method according to claim 8 wherein the signal gating is triggered by detection of a threshold amplitude of the reference signal.

10. A method according to claim 1 wherein the step of processing the input reference signal includes extending spectral content of the reference signal in spectral domain to generate the control signal.

11. A method according to claim 1 wherein the step of processing the input reference signal includes adjusting dynamic range of the input reference signal to generate the control signal.

12. A method according to claim 1 wherein the step of processing the input reference signal includes modulating the input reference signal with an external signal to generate the control signal.

13. A method according to claim 1 wherein the step of processing the input reference signal includes generating a synthetic control signal having characteristics based on the input reference signal.

14. A method according to claim 1, wherein the predetermined period of time includes time windows during a detected noise event or shortly before and/or after a detected noise event.

15. A method according to claim 1 wherein the predetermined period of time includes a period covering 5 to 15 predetermined time windows.

16. A method according to claim 1 wherein comparing the power spectra includes iteratively performing a spectral subtraction of the reference power spectra from the signal power spectra across different predetermined time windows to determine a relationship between fluctuations of the respective power spectra.

17. A method according to claim 1 wherein comparing the power spectra includes performing a least mean squares method on the respective reference power spectra and signal power spectra over the predetermined period of time.

18. A method according to claim 1 including the step of calculating estimated noise event power contribution values for each frequency bin in each spectrum within the predetermined period of time.

19. A method according to claim 18 wherein the step of selectively modifying the audio signal includes calculating suppression gain coefficients for each frequency bin within the predetermined period of time based on a comparison of the estimated noise event power contribution values with the signal power values within the predetermined period of time.

20. A method according to claim 19 including the step of multiplying the signal power values by the suppression gain coefficients to generate modified signal power values.

21. A method according to claim 20 including the step of inverse transforming the modified signal power values into the time domain to produce a modified audio signal.

22. A method according to claim 1 wherein the input reference signal is a vibration signal from a vibration sensor.

23. A method according to claim 1 wherein the input reference signal is a detection signal from a button press on a user interface.

24. A method according to claim 1 wherein the input reference signal originates from a second microphone.

25. A method according to claim 24 wherein the input reference signal is a filtered version of an audio signal from the second microphone.

26. A method according to claim 1 wherein the input audio signal and input reference signal are incoherent.

27. An audio capture system for suppressing noise due to mechanical disturbances, the system including:
   a first input port for receiving an input audio signal from a microphone;
   a second input port for receiving an input reference signal from a sensor other than the microphone, wherein the input reference signal is separate from the input audio signal; and
   a processor configured for:
      transforming the input audio signal into the frequency domain;
      processing the input reference signal to generate a control signal for identifying a noise event;
      in response to the control signal identifying a noise event, estimating a contribution of the noise event to the input audio signal;
      based on the estimated contribution of the noise event, selectively modifying the input audio signal to generate an output audio signal in which the noise arising from the noise event is at least partially suppressed,
   wherein processing the input reference signal includes transforming the input reference signal into the frequency domain;
   wherein transforming the reference signal includes iteratively transforming the reference signal over predetermined time windows to calculate respective temporally evolving reference power spectra indicative of the reference signal, each reference power spectrum including reference power values separated into a plurality of frequency bins;
   wherein transforming the input audio signal includes iteratively transforming the input audio signal into the frequency domain over the predetermined time windows to calculate respective temporally evolving signal power spectra indicative of the input audio signal, each signal power spectrum including signal power values separated into a like plurality of frequency bins to the reference power spectra; and
   wherein estimating the contribution of the noise event to the input audio signal involves applying an adaptive filter in the frequency domain to the reference power spectra and determining parameters of the adaptive filter by comparing the signal power spectra and the reference power spectra over a predetermined period of time, wherein the parameters of the adaptive filter are based on a difference between the reference power spectra after applying the adaptive filter and the signal power spectra.

28. An audio capture system according to claim 27 wherein the processor is further configured for:
   analyzing the input reference signal to classify potential noise events likely to be associated with an external disturbance; and
   wherein the processing of the input reference signal is based on the classifying.

* * * * *